March 26, 1963 M. S. MILLHOUSE ETAL 3,082,491
TRIM AND SEAL MEANS

Filed Dec. 21, 1959 2 Sheets-Sheet 1

INVENTORS
Murray S. Millhouse
BY Walter Ziffer

Albert H. Reuther
Their Attorney

March 26, 1963 M. S. MILLHOUSE ETAL 3,082,491
TRIM AND SEAL MEANS
Filed Dec. 21, 1959 2 Sheets-Sheet 2
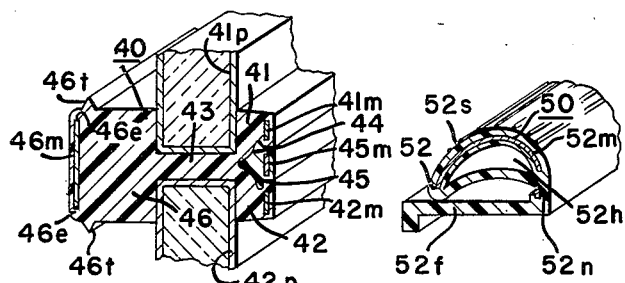
Fig. 3
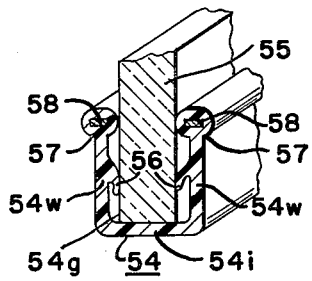
Fig. 4
Fig. 5
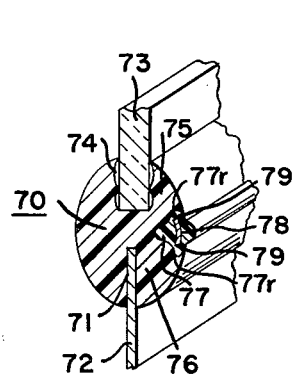
Fig. 7
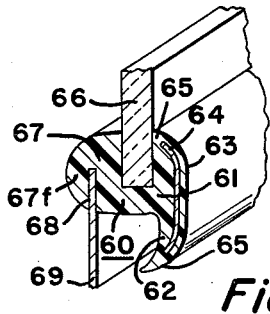
Fig. 6
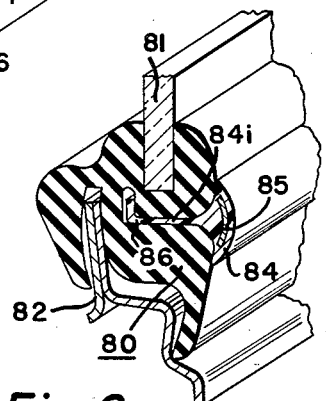
Fig. 8
INVENTORS
Murray S. Millhouse
BY Walter Ziffer
Their Attorney

United States Patent Office 3,082,491
Patented Mar. 26, 1963

3,082,491
TRIM AND SEAL MEANS
Murray S. Millhouse and Walter Ziffer, Dayton, Ohio, assignors to General Motors Corporation, Detroit, Mich., a corporation of Delaware
Filed Dec. 21, 1959, Ser. No. 860,789
3 Claims. (Cl. 20—69)

This invention relates to plastic trim and seal means and, particularly, to metallized trim and seal means having opposite sides formed of a relatively clear and flexible outer body of plastic material.

An object of this invention is to provide a new and improved plastic trim and seal means protected against discoloration and deterioration yet inexpensive to mass produce in various shapes including a metallized relatively clear and flexible outer body of plastic material.

Another object of this invention is to provide in combination a plastic trim and seal means including a hollow flexible portion formed of clear and flexible plastic material that covers opposite sides of a flexible metallized layer of vapor-deposition particles, thin metal foil and the like having a brilliant luster to simulate brass, chrome, copper as well as gold and resiliently deformable though permanently protected against discoloration and weathering while integral with a flange portion adapted to fit into engagement complementary with a mounting channel on a motor vehicle.

Another object of this invention is to provide in combination a retainer having at least a pair of adjacent mounting grooves into one of which a foam-like weatherstrip of resilient material is fitted and in the other of which a flange portion of plastic trim and seal means is fitted such that a trim-seal portion integral with the flange portion in part is engageable relative to the foam-like weatherstrip along a laterally deformable longitudinal edge of the trim-seal portion which includes clear and flexible plastic material covering opposite sides of a flexible metallized layer of vapor-deposition particles, thin metal foil and the like having a brilliant luster to simulate brass, chrome, copper as well as gold and resiliently deformable though permanently protected against discoloration and weathering.

A further object of this invention is to provide a combination seal and trim means adapted to fit variously glass, vehicle body sheet metal, building construction panels and the like in sealing engagement enhanced by a metallic foil portion extruded into transparent elastomeric material that covers and protects luster of the foil portion while the latter is flexible laterally though providing a strengthening backing for the elastomeric material against tearing and tear propagation and backing for enhancing sealing engagement of the elastomeric material relative to a predetermined structure.

Another object of this invention is to provide a weatherstrip means including at least one longitudinal groove therein for receiving a panel means of metal, glass, and the like and made of transparent elastomeric material extruded with metallic foil in a thickness ranging between one- and three-thousandths of an inch embedded therein adjacent to surface of flange portions integral with the weatherstrip means.

Further objects and advantages of the present invention will be apparent from the following description, reference being had to the accompanying drawings wherein preferred embodiments of the present invention are clearly shown.

In the drawings:

FIGURE 3 shows another structure embodying trim and seal means in accordance with the present invention.

FIGURE 4 is a cross-sectional elevational view of a hollow seal portion having foil embedded therein as lustrous backing inside transparent elastomeric plastic material having an integral mounting flange portion adapted to flexible yet practical as a seal and decorative.

FIGURE 5 is a cross-sectional elevational view of another trim and seal means in accordance with the present invention.

FIGURE 6 is a cross-sectional elevational view of further trim and seal means of this invention.

FIGURE 7 shows an elevational sectioned view of another seal means having metallic foil embedded as extruded therein.

FIGURE 8 shows an elevational sectional view of seal means utilizing a locking strip of transparent elastomeric material with foil extruded into the strip.

In recent years, there has been increased use of paneling made of metal, wood, plastic as well as glass and the like mounted relative to rubber or rubber-like strips used on motor vehicles, appliances such as refrigerators, and even office buildings and the like. Most frequently such strips are made of opaque rubber or rubber-like material which is relatively inflexible as well as unsightly. For example, on motor vehicles a large number of cars, have been produced having a "hardtop" body structure in which a weather seal is required between a side roof rail relative to a reciprocally movable window mounted and movable relative to a door. Formerly, vehicle doors were provided with a rigid frame including both upper and lower portions of a door whereas now the upper portions of such doors have been generally eliminated and only a lower door structure exists relative to which a window pane can be raised and lowered. The glass of the window pane on the "hardtop" body structures generally has an edging carried thereby so as to add rigidity to the pane or panel of glass and to avoid possible chipping of panel edges or cutting of vehicle passengers in the event any part of their bodies comes into contact with an edge of the panel or pane of glass.

Figure 1:
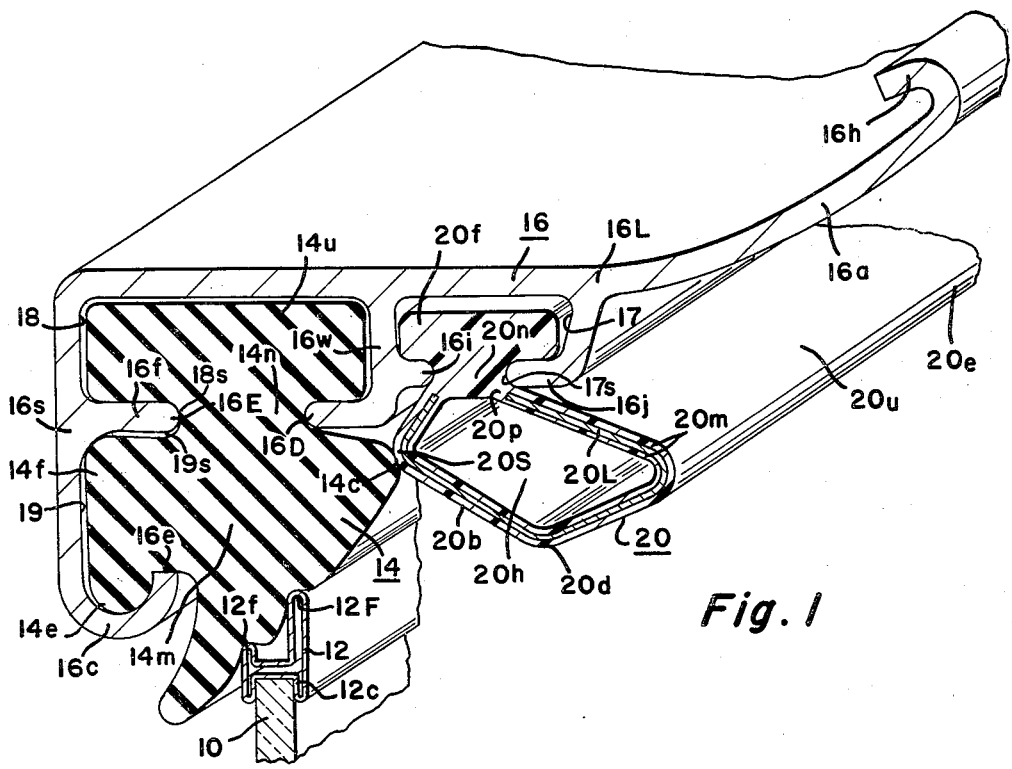
FIGURE 1 is a fragmentary cross-sectional perspective view of a retainer as well as combination seal and trim means in accordance with the present invention.

FIGURE 1 illustrates a fragment of a panel 10 of material such as glass relative to which an edging or frame 12 is mounted. Preferably the edging or frame 12 has a lustrous finish as provided by a chrome alloy and the window panel 10 is press-fitted into engagement with side walls of a channel 12c of the edging or frame. The edging or frame has at least one and preferably two flange portions such as 12F and 12f with relatively longer and shorter configurations respectively each engageable relative to a foam-like strip of extruded elastomeric material generally indicated by numeral 14. Generally, such a strip 14 is made of extruded foam rubber or rubber-like foam material having a suitable color generally black. The strip 14 can be referred to as a main seal and is locked into engagement with an end retainer or side roof rail mounting means generally indicated by numeral 16. This mounting means 16 is preferably made of extruded aluminum or similar light-weight metal having a generally L-shaped configuration including a short leg portion 16s and a relatively longer leg portion 16L. The short leg portion 16s is located in a substantially vertical plane adjacent to a passenger compartment of a vehicle. The short leg portion 16s terminates at its lower end in a curved flange portion 16c having a free end 16e substantially in alignment with and extending toward a free end 16E of a flange portion 16f which extends laterally outwardly from an intermediate portion of the short leg 16s.

The longer leg 16L is adapted to be located in a substantially horizontally extending position with an arcuate portion 16a extending laterally outwardly and terminating in a hook portion 16h relative to which a roof panel is bent and attached. Adjacent to the hook portion 16h there is generally a trough or channel for drainage of a substantial amount of water off of the roof so as to prevent overflow thereof relative to the strip 14 and frame 12 of a window panel. However, the strip 14 is important as a weather seal because some water does pass under the arcuate portion 16a and along the window panel and strip.

Extending laterally and downwardly from the longer leg 16L there is an intermediate wall portion 16w which terminates in a horizontally bent detent portion 16D that is substantially coplanar with end 16E of flange portion 16f. An intermediate flange portion 16i is integral with and extends laterally or horizontally from the wall portion 16w in a direction opposite to that of the detent portion 16D. A substantially J-shaped locking portion 16j extends downwardly from the longer leg portion 16L and terminates in an end extending toward and coplanar with the intermediate flange portion 16i. The J-shaped locking portion 16j together with the intermediate flange portion 16i, wall portion 16w and longer leg portion 16L form a continuous longitudinal channel 17 open downwardly in a slot 17s for receiving structure to be described further in accordance with the present invention. A corner cavity 18 and longitudinal slot opening 18s is defined by flange portion 16f, short leg portion 16s, longer leg portion 16L, wall portion 16w and detent portion 16D. A lower locking recess 19 open laterally outwardly as indicated by numeral 19s is formed by flange portion 16f, short leg portion 16s and curved end portion 16c–16e. An upper flange portion 14u substantially rectangular in shape is adapted to be snapped resiliently into locking engagement with the corner cavity 18. The upper flange portion 14u is integral with a neck portion 14n joined to a main body 14m of the strip 14. Also integral with the main body portion 14m is a lower flange portion 14f adapted to fit the groove or recess 19 formed as described earlier. Since the strip 14 is made of resilient, elastomeric material, the upper flange portion 14u and lower flange portion 14f can be momentarily deformed such that each of the flange portions is fitted snugly into engagement with the cavity or recess adapted to receive the respective flange portions. The detent portion 16D as well as flange portion 16f hinders downward movement of strip 14 due to locking engagement of the upper flange portion 14u into confines of the cavity 18. An end portion 14e of the lower flange 14f is adapted to fit in locking engagement with the end 16e so as to avoid lateral dislocation of the strip 14.

A combination plastic trim and seal means generally indicated by numeral 20 in accordance with the present invention is adapted to fit in a predetermined position relative to the retainer 16 and strip means 14. The combination trim and seal means 20 includes a flexible portion 20p formed of a clear and flexible plastic material 20m that covers opposite sides of a flexible metallized layer 20L totally imbedded and extending longitudinally in a substantially parallelogram-shaped cross section relative to the flexible portion 20p. The material 20m is preferably a clear and possibly slightly tinted plastic such as vinyl that protects and maintains a plastic covering relative to brilliant luster to simulate brass, chrome, copper as well as gold that can be provided with the metallized layer 20L. There is a hollow interior portion 20h extending longitudinally relative to the combination trim and seal means and a neck portion 20n integral with the flexible portion 20p at a location adjacent to integral flange portion 20f that fits into channel 17 formed as described earlier. The flange portion 20f is substantially rectangular in shape and complementary to the channel 17 as well as the longitudinal opening or slot 17s thereof. The intermediate portion 16i and hook-shaped or J-shaped portion 16j are adapted to avoid dislocation of the combination trim and seal means 20 from locking engagement relative to the channel 17. Any clear plastic and flexible material can be used to form the entire trim and seal means combination having the metallized layer 20L extending arcuately around the hollow interior 20h. A plastic protected lateral end 20e projects laterally to one side of the J-shaped portion 16j such that water from rain or melted snow and the like drains laterally outwardly over an upper surface 20u away from the retainer 16. A sealing edge 20s is reinforced by the metallized layer 20L and is adapted to engage a curved corner portion 14c of the strip means 14. The metallized layer 20L reinforces and backs the sealing corner 20s so as to enhance engagement relative to the strip 14 and avoid seepage of water into either channel 17 or cavity 18. A lower surface or bottom wall 20b of the combination trim and seal means 20 extends downwardly and terminates in a drip corner 20d spaced laterally away from strip 14 as well as frame 12 and panel 10 such that water tends to drop away from the structure shown in FIGURE 1. Thus, one corner of the parallelogram-shaped flexible portion 20p is integral with the flange portion 20f for mounting and the three remaining corners or edges represented by numerals 20e, 20d, and 20s serve individual purposes as mentioned earlier.

In accordance with the present invention, the combination trim and seal means 20 has the lustrous metallized layer 20L which is embedded in the clear plastic material during extrusion thereof into the shape illustrated by FIGURE 1. The metallized layer 20L preferably has a thickness of .002 inch. When "dead soft" aluminum foil is used for the metallized layer 20L, the aluminum foil is useful in a thickness range between .001 inch to .003 inch. However, it has been found that foil having a thickness of .005 inch would be too stiff to be useful or sufficiently flexible in the structure of combination trim and seal means in accordance with the present invention. It is also possible to use a thin sheet of plastic material such as cellulose acetate having an evaporated metal material thereon in a thickness ranging between 4 and 5-millionths of an inch. Vapor disposition of any suitable spray material can be used. Simulated wood can also be provided in place of the foil. Lead foil oxidizes too rapidly unless sprayed with a protective liquid and preferably a highly reflective material such as aluminum foil is provided as the metallized layer 20L. For gold simulation and the like, the aluminum foil can be anodized. It should be noted that, due to resilience and flexibility of the clear vinyl material as well as the metallized layer 20L, it is possible for the edge 20e to be deflected without permanent indentation thereof.

Figure 2:
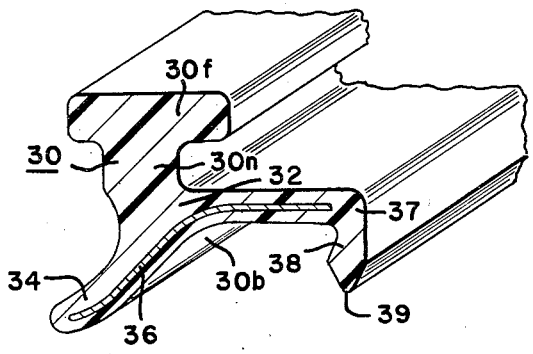
FIGURE 2 is a fragmentary cross-sectional view of another embodiment of seal and trim means for use with the retainer of FIGURE 1.

Another combination trim and seal structure adapted for use in channel 17 of FIGURE 1 is illustrated in FIGURE 2 and is represented generally by numeral 30. The combination trim and seal means 30 is also extruded longitudinally to include a mounting flange portion 30f adapted to fit in the channel 17 together with a neck portion 30n adapted to fit into the longitudinal slot opening 17s. The combination trim and seal means 30 further includes a body portion 32 having integral therewith an arcuate sealing lip portion 34 of flexible clear plastic material such as vinyl that surrounds opposite sides of a metallized layer 36. The metallized layer extends longitudinally relative to the body portion 32 including the sealing lip portion 34 and this layer 36 is aluminum foil and the like with a generally S-shaped cross section extending from the sealing lip portion 34 to a shielding end of canopy-like cover portion 37. A depending end portion or drip flange 38 terminating in a relatively pointed end 39 is provided integral and extending downwardly from the canopy-like cover portion 37. The drip end aids in dispersal of water and the like downwardly off of the cover end portion 37 and away from a bottom surface 30b adjacent to sealing lip portion 34. The metallized layer of aluminum foil, simulated wood, and the like is clearly visible through the transparent plastic material and the layer 36 also serves as a backing to enhance positioning of the sealing lip portion 34 as well as the cover or end portion 37.

It is to be understood that the extruded metal retainer 16 can be suitably attached to a side roof structure of a vehicle in any suitable manner such as by screws or clamps inserted through openings or slots in the longer leg portion 16L. The specific manner in which the retainer 16 is attached to a vehicle does not form part of the present invention and, therefore, no specific showing of such structure is made in the drawings. It is to be noted that a combination trim and seal means such as 30 can also be mounted relative to a groove or channel along mating body panels on a motor vehicle so as to seal the juncture and at the same time have oppositely extending sealing lip or cover portions enclosing a metallized layer embedded therein. The metallized layer is protected against water, salt solutions, road film and the like by clear plastic material in which the aluminum foil for example is embedded. A flange such as 30f can serve as an anchor for holding the combination trim and seal means in position relative to a juncture of mating vehicle panel portions such as between a fender and luggage storage compartment cover of a vehicle body. Various decorative and functional advantages are realized by provision of combination trim and seal means in accordance with the present invention. An exposed body portion of the combination trim and seal means can be maintained in a shiny and lustrous condition even though manufactured by extrusion of plastic material. Aluminum foil and the like is clearly visible through the transparent plastic and a shield to protect against weather and to hide unsightly black foam-like strip material such as would be used for strip 14 is available. The combination of the transparent plastic material and metallized layer performs dual functions of both sealing relative to another part due to contact of the clear plastic material relative thereto as well as shedding and deflecting of water over the outer surface of the clear plastic material that protects the lustrous finish of the metallized layer against deterioration. There is a reduction in the number of parts required and complex interlocking thereof whereby previously a separate sheet metal trim piece having a chrome-like finish had to be secured relative to elastomeric sealing strips alone. Costs and difficulty in manufacturing combination trim and seal means in accordance with the present invention is considerably less than cost of manufacturing a chrome-like metal trim strip separate from an elastomeric weatherstrip. The sealing lip portions in which the metallized foil or layer is embedded prevents leakage of water by deflection thereof away from a vehicle body juncture between a mounting flange thereof and retainer groove. The flange portion of the combination trim and seal means is integral with a resilient and flexible as well as ornamental sealing lip and water shedding shield portion.

FIGURE 3 illustrates a structural sealing strip generally indicated by numeral 40 including wing or extended portions 41 and 42 joined to a connecting member 43 by relatively thin web portions and having a groove 44 therebetween. A longitudinal wedge 45 is adapted to fit in locking engagement with undercut edges of the groove 44 so as to effect engagement of the wings 41 and 42 relative to a pair of spaced structural panels 41p and 42p in sealing engagement therewith. An opposite side of the structural panels 41p and 42p is engaged by an extended portion 46 of the seal 40. It is to be noted that the structural panels 41p and 42p can be opaque and colored parts prefabricated in square or rectangular sections which can be stacked on top of each other or positioned adjacent to each other relative to structural seal means 40. The panels 41p and 42p can also be dual window or glass panels as well as other heavy window pane structure frequently used for building construction wherein seal means 40 serve as a window frame-like structure of resilient material. Preferably, the seal means 40 is made of a transparent elastomeric material with a metallized layer extruded therein. The wings 41 and 42 include metallized layers 41m and 42m respectively having a thickness in a range described earlier. The wedge 45 also includes a metallized layer 45m adjacent to an exposed surface thereof that complements adjacent wings 41 and 42 and respective metallized layers 41m and 42m. The extended portion 46 has a metallic foil or layer 46m embedded closely adjacent to an outer surface thereof with opposite ends of the foil as indicated by 46e terminating adjacent to laterally outwardly extending sealing ribs or trim portions 46t parallel to each other and extending longitudinally as extruded with the sealing strip means 40.

FIGURE 4 illustrates a combination trim and seal means similar to trim and seal means 20 of FIGURE 1. The combination trim and seal means 50 of FIGURE 4 includes an extruded hollow body portion 52 of flexible transparent plastic material such as clear vinyl having a longitudinally serrated surface 52s. The serrated surface is adapted to engage a surface such as along an edge of a refrigerator cabinet opening and a metallized layer such as aluminum foil and the like indicated by reference numeral 52m is covered by the clear plastic material on opposite sides. Both the serrated surface 52s and metallized layer 52m can be deflected relative to a hollow interior 52h. The combination trim and seal means 50 includes a neck portion 52n that joins the body portion 52 with an integral flange portion 52f for mounting of the combination trim and seal means relative to a pivotally movable panel such as a door of a refrigerator.

It is to be understood that the combination trim and seal means 50 of FIGURE 4 can also be used on vehicle doors wherever a sealing surface such as 52s is exposed together with the plastic protected metallized layer 52m. It is also possible that pivotally mounted window vent structure can be provided with such a combination trim and seal means. FIGURE 5 illustrates a rigid channel member generally indicated by numeral 54 including an intermediate body portion 54i as well as a pair of side wings 54w. The channel 54 has a U-shaped configuration defining a groove 54g relative to which a panel 55 made of material such as glass can be inserted and resiliently engaged on opposite sides by inwardly extending sealing ribs 56 integral with the wings 54w. Each of the wings 54w terminates in an enlarged longitudinally extending bead portion 57 extruded of transparent plastic material in which longitudinally extending strips 58 of metallic foil or layering and the like having a lustrous finish can be embedded. The channel 54 including the embedded foil or layering 58 can be used as a frame for window panels of a motor vehicle. The channel 54 is particularly useful for mounting glass relative to a vehicle body in locations where the glass is adapted to remain fixed rather than movable relative to the body.

FIGURE 6 illustrates a combination trim and seal means generally indicated by numeral 60 and including a central web portion 61 integral with an arcuately-shaped body portion 62 having a curved surface 63 of transparent elastomeric material in which a crescent-shaped longitudinally extending metallized layer 64 is embedded in accordance with the present invention. The metallized layer 64 terminates adjacent to sealing lip ends 65 of the body portion 62 at least one end of which is adapted to engage a glass panel such as 66. Also integral with the web portion 61 there is a rear or extended portion 67 having a flange 67f integral therewith adjacent to a recess 68 adapted to receive a metal panel 69 such as on a vehicle body.

FIGURE 7 illustrates a sealing strip generally indicated by numeral 70 having a recess 71 adapted to receive a metal panel 72 of a vehicle body as well as a glass panel 73 fitted relative to a groove 74. The sealing strip 70 includes opaque elastomeric wing portions 75 and 76 that form a groove therebetween into which a wedge 77 is adapted to be forced in locking engagement. The web 77 is made of transparent elastomeric material with a metallic layer or aluminum foil or the like indicated by numeral 78 embedded therein. The metallic layer includes a pair of opposite ends 79 that terminate adjacent to locking ribs 77r of the wedge 77. The foil thus serves as a backing for these ribs 77r.

FIGURE 8 illustrates a sealing strip generally indicated by numeral 80 adapted to engage a panel 81 of material such as glass as well as a sheet metal piece 82. A wedge 84 of transparent plastic includes a metallized layer 85 arcuate in shape embedded therein. A J-shaped portion 84j is integral with wedge 84 and is adapted to lock into engagement with a complementary J-shaped groove 86 of the seal 80. The seal 80 can be used as weather-stripping for a vehicle windshield or back window and metallized layer 85 serves as a lustrous frame therefor protected by a clear plastic material.

While the embodiments of the present invention as herein disclosed constitute preferred forms, it is to be understood that other forms might be adopted.

What is claimed is as follows:

1. For use on a motor vehicle having an opening adapted to be closed by a panel means such as a door, window and the like, a weatherstrip assembly, comprising, a metal channel having substantially an L-shape with integral flange portions forming at least a pair of adjacent mounting recesses, an opaque sealing strip of relatively unsightly material though durably engaged by the panel means and fitted into at least one of the mounting recesses, and a combination trim and seal means having an integral flange portion also fitted into said other mounting recess adjacent to said strip and further including a curved flexible body portion of transparent plastic material that forms at least one laterally integral sealing lip means engaging said opaque strip and covered at least in part thereby, and a unitary and continuous lustrous metallized trim layer totally embedded only in said transparent plastic material including said sealing lip means as internal backing therefor shielded and protected fully against weathering by said transparent plastic material.

2. Combination shielded trim and complementary seal means, comprising, a longitudinally extending mounting body portion made of a flexible material that forms a longitudinal groove, a separable locking wedge means fitted in the groove of said mounting body portion and formed of transparent plastic material, and a metallized thin trim layer totally embedded at least in said transparent plastic material of said locking wedge means as trim and visible backing protectively shielded therein.

3. Combination shielded trim and complementary seal means, comprising, a longitudinally extending mounting body portion made of a flexible transparent plastic material that forms at least one longitudinally extending groove therein, a sealing lip means integral with said body portion and extending at least in part toward said groove, and a unitary and continuous lustrous metallized thin trim layer totally embedded and extending in said transparent plastic material including said sealing lip means as internal backing therefor shielded and protected fully against weathering by said transparent plastic material.

References Cited in the file of this patent

UNITED STATES PATENTS

| | | |
|---|---|---|
| 2,268,258 | Lytle | Dec. 30, 1941 |
| 2,657,589 | Sampson | Nov. 3, 1953 |
| 2,737,412 | Smith et al. | Mar. 6, 1956 |
| 2,781,597 | Doane | Feb. 19, 1957 |
| 2,892,658 | Peras | June 30, 1959 |
| 2,912,727 | Sehn | Nov. 17, 1959 |